US008471696B2

(12) United States Patent
Singh et al.

(10) Patent No.: US 8,471,696 B2
(45) Date of Patent: *Jun. 25, 2013

(54) SYSTEM AND METHOD FOR PROVIDING A TASK REMINDER

(75) Inventors: Munindar P. Singh, Cary, NC (US); Mona Singh, Cary, NC (US)

(73) Assignee: Ektimisi Semiotics Holdings, LLC, Portsmouth, NH (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/458,210

(22) Filed: Apr. 27, 2012

(65) Prior Publication Data

US 2012/0214517 A1    Aug. 23, 2012

Related U.S. Application Data

(63) Continuation of application No. 13/177,055, filed on Jul. 6, 2011, now Pat. No. 8,188,856, which is a continuation of application No. 12/632,229, filed on Dec. 7, 2009, now Pat. No. 7,999,669, which is a continuation of application No. 11/536,232, filed on Sep. 28, 2006, now Pat. No. 7,649,454.

(51) Int. Cl.
*G08B 21/00*    (2006.01)

(52) U.S. Cl.
USPC ............... 340/539.11; 340/539.13; 455/456.1

(58) Field of Classification Search
USPC ..................... 709/206, 224, 226; 340/539.11, 340/539.13, 573.1; 455/456.1
See application file for complete search history.

(56) References Cited

U.S. PATENT DOCUMENTS

| 5,938,721 | A | 8/1999 | Dussell et al. |
|---|---|---|---|
| 6,177,905 | B1 | 1/2001 | Welch |
| 6,266,612 | B1 | 7/2001 | Dussell et al. |
| 6,411,899 | B2 | 6/2002 | Dussell et al. |
| 6,484,033 | B2 | 11/2002 | Murray |
| 6,515,585 | B2 | 2/2003 | Yamamoto |
| 6,611,754 | B2 | 8/2003 | Klein |
| 6,680,675 | B1 | 1/2004 | Suzuki |
| 6,819,256 | B2 | 11/2004 | Hampton |
| 6,879,838 | B2 | 4/2005 | Rankin et al. |
| 6,943,671 | B2 | 9/2005 | McGee et al. |
| 6,944,539 | B2 | 9/2005 | Yamada et al. |
| 6,957,076 | B2 | 10/2005 | Hunzinger |
| 7,003,525 | B1 | 2/2006 | Horvitz et al. |
| 7,084,758 | B1 | 8/2006 | Cole |
| 7,155,456 | B2 | 12/2006 | Abbott, III et al. |
| 7,395,507 | B2 | 7/2008 | Robarts et al. |
| 7,512,889 | B2 | 3/2009 | Newell et al. |

(Continued)

OTHER PUBLICATIONS

Bhawalkar, P., et al., "ScheduleNanny: Using GPS to Learn the User's Significant Locations, Travel Times and Schedule," [online] Sep. 2004 [retrieved on Apr. 21, 2006] Retrieved from the Internet: <URL: http://arxiv.org/ftp/cs/papers/0409/0409003.pdf> 8 pages.

*Primary Examiner* — Jeffery Hofsass

(57) ABSTRACT

Systems, methods, and computer readable media for providing a task reminder are disclosed herein. The method includes receiving a location of a user of a mobile communication device. The method includes identifying task information including a task location. The method includes receiving historical presence information identifying least one of a number of times the user is present at the location and an amount of time the user is present at the location. The method includes providing a reminder of the task for presentation based on the historical presence information and a distance between the task location and the location of the user.

18 Claims, 7 Drawing Sheets

U.S. PATENT DOCUMENTS

| | | |
|---|---|---|
| 7,533,082 B2 | 5/2009 | Abbott et al. |
| 7,614,001 B2 | 11/2009 | Abbott et al. |
| 2002/0067308 A1 | 6/2002 | Robertson |
| 2002/0086680 A1 | 7/2002 | Hunzinger |
| 2002/0120351 A1 | 8/2002 | Tuomela et al. |
| 2003/0224762 A1 | 12/2003 | Lau et al. |
| 2003/0225589 A1 | 12/2003 | Eaton et al. |
| 2004/0176107 A1 | 9/2004 | Chadha |
| 2004/0192311 A1 | 9/2004 | Koskinen et al. |
| 2004/0203847 A1 | 10/2004 | Knauerhase et al. |
| 2004/0230685 A1 | 11/2004 | Seligmann |
| 2005/0009573 A1 | 1/2005 | Tokkonen |
| 2005/0102098 A1 | 5/2005 | Montealegre et al. |
| 2006/0077055 A1 | 4/2006 | Basir |
| 2006/0225076 A1 | 10/2006 | Longobardi |
| 2007/0072629 A1 | 3/2007 | Bae |
| 2007/0159322 A1 | 7/2007 | Garratt Campbell |
| 2007/0230282 A1 | 10/2007 | May et al. |
| 2007/0250257 A1 | 10/2007 | Almy |
| 2008/0079566 A1 | 4/2008 | Singh et al. |
| 2008/0082651 A1 | 4/2008 | Singh et al. | ns to more fully describe the represen-# SYSTEM AND METHOD FOR PROVIDING A TASK REMINDER

CROSS-REFERENCE TO RELATED APPLICATIONS

This application is a continuation of U.S. patent application Ser. No. 13/177,055 titled "SYSTEM AND METHOD FOR PROVIDING A TASK REMINDER," filed on Jul. 6, 2011, which is a continuation of U.S. patent application Ser. No. 12/632,229 titled "SYSTEM AND METHOD FOR PROVIDING A TASK REMINDER," filed on Dec. 7, 2009, which is a continuation of U.S. patent application Ser. No. 11/536,232 titled "SYSTEM AND METHOD FOR PROVIDING A TASK REMINDER," filed on Sep. 28, 2006, the entire disclosure of which are here incorporated by reference. U.S. patent application Ser. No. 11/536,232 titled "SYSTEM AND METHOD FOR PROVIDING A TASK REMINDER," is related to U.S. patent application Ser. No 11/536,306, entitled "APPARATUS AND METHOD FOR PROVIDING A TASK REMINDER BASED ON TRAVEL HISTORY" now U.S. Pat. No. 7,528,713, filed concurrently and commonly owned with U.S. patent application Ser. No. 11/536,232 and the entire disclosure of which is here incorporated by reference.

BACKGROUND

Handheld electronic devices, such as personal digital assistants (PDAs), mobile phones, digital cameras, and the like, offer mobility and a variety of services to their respective users. While they are typically configured to transmit and receive data to and from other devices via a wired or wireless connection, most mobile communication devices can also provide Internet access, maintain a personal address book, provide messaging capabilities, capture digital images, and place phone calls. Many devices, in particular smart phones and PDAs, provide a calendaring and/or "to-do list" service that allows the user to calendar appointments and to enter tasks directly into the device or into a service in a remote server. The calendaring service can be configured to provide a reminder of an appointment or task to the user at or near the time the appointment has been scheduled.

Many mobile communication devices can also identify their respective locations within a certain range depending on the device and location identifying technique. Some devices can use a sophisticated position determining system, such as a Global Positioning System (GPS). The GPS is a satellite-based radio navigation system that uses signals from three or four satellites to compute the current latitude, longitude and elevation of a GPS receiver in the device anywhere on earth down to within a few meters. Other devices can use a location identifying technique based on which base station is servicing the device, that is, the location of the device is within a range of the base station from which a call is made. Other devices can use location identifying techniques based on triangulation between the device and at least two base stations.

The device's location, typically represented by geospatial coordinates, can be used in a variety of ways. For example, a mapping service can use the device's current location to provide street directions from the current location to a desired destination location. In addition, a street address or name corresponding to the geospatial coordinates can be associated with a task or an appointment that is scheduled to be performed at or near the location. For example, the user can associate a task on the to-do list, e.g., "pick up medicine," with the street address or geospatial coordinates associated with a task location, e.g., the user's pharmacy. When the device detects that the user is within a certain distance of the task location, e.g., the pharmacy, the device can display a message reminding the user to perform the task, e.g., "pick up medicine." Alternatively, a reminder can be issued when the device detects that the user is near the task location and is traveling in a trajectory leading to the task location.

Location-based task reminders are useful for prompting the user to perform tasks that are located nearby. Typically, the reminders are generated when the user comes within a predetermined fixed distance of the task location. This can be problematic because, if the predetermined distance is relatively large, e.g., 0.5 miles, and the user frequently spends time in the 0.5 mile region surrounding the task location, e.g., the user lives or works in the region, the user can be inundated with multiple reminders for the task. On the other hand, if the predetermined distance is relatively small, e.g., 0.1 miles, and the user rarely spends time in the region, let alone within 0.1 miles of the task location, the device might not provide a reminder at all. Both situations reduce the usefulness and convenience of location-based reminders.

To address this problem, some services allow the user to enter a reminder distance when the user calendars the task and task location. This approach, however, may not be helpful if the user is unfamiliar with the task location, or if another person other than the user is calendaring the task for the user. In any event, requiring the user to provide information in addition to the task/appointment and task location can be time-consuming and inconvenient.

SUMMARY

Accordingly, an apparatus and method for providing a task reminder are described. According to one exemplary embodiment, the apparatus includes a monitoring module that monitors a location of a user via a mobile communication device associated with the user at predetermined time intervals for tracking historical travel information of the user, and a data store for storing the historical travel information and for storing user specified task information that includes a task and a task location. In an exemplary embodiment, the apparatus includes a reminder module that calculates a novelty rating of a region that includes the task location and a current position of the user based on the user's historical travel information. The novelty rating is related to a historical presence of the user in the region. The apparatus also includes a message module that generates a reminder of the task based on the novelty rating of the region and a distance between the task location and the current position of the user.

According to another exemplary embodiment, a method of providing a task reminder includes tracking historical travel information of a user of a mobile communication device by monitoring a location of the user via the mobile communication device at predetermined time intervals, receiving task information of the user that includes a task and a task location, and storing the user's historical travel information and user-specified task information in a data store. The method further includes determining a novelty rating of a region that includes the task location and a current position of the user based on the user's historical travel information, where the novelty rating is related to a historical presence of the user in the region, and generating a reminder of the task based on the novelty rating of the region and a distance between the task location and the current position of the user.

BRIEF DESCRIPTION OF THE DRAWINGS

The accompanying drawings provide visual representations which will be used to more fully describe the representative embodiments disclosed here and can be used by those skilled in the art to better understand the representative embodiments and their inherent advantages. In these drawings, like reference numerals identify corresponding elements, and.

DETAILED DESCRIPTION

Various aspects will now be described in connection with exemplary embodiments, including certain aspects described in terms of sequences of actions that can be performed by elements of a computing device or system. For example, it will be recognized that in each of the embodiments, at least some of the various actions can be performed by specialized circuits or circuitry (e.g., discrete and/or integrated logic gates interconnected to perform a specialized function), by program instructions being executed by one or more processors, or by a combination of both. Thus, the various aspects can be embodied in many different forms, and all such forms are contemplated to be within the scope of what is described.

According to an exemplary embodiment, intelligent, situation-sensitive task reminders are generated for a user of a mobile communication device. In one embodiment, a task reminder can be generated based on at least two factors: (1) a distance between the user's current position and the task location, and (2) a novelty rating of the current position with respect to the task location. The novelty rating is a reflection of the user's historical presence in a region encompassing the current position and the task location. The more frequently the user visits or is present in the region, or the more time the user spends in the region, the less novel the region is to the user, and vice versa.

According to an exemplary embodiment, when the region's novelty rating is low, i.e., the user has frequently visited the region or has spent a large amount of time in the region, a reminder is generated when the user's position is very close to the task location. On the other hand, when the region's novelty rating is high, i.e., the user has spent little or no time in the region, a reminder can be generated when the user's position is near but not close to the task location.

For example, a user who lives in Cary, N.C. can be reminded of a task at the Cary library when the user is within a block of or in front of the library. Whereas, a user who lives 30 miles away in Chapel Hill can be reminded of a task at the Cary library when the user travels within three miles of the library, say, on a trip to the Cary Towne Center Mall; the rationale being that if the user rarely visits the region, then any such visit might be justification to try to complete the task in the region. By considering the novelty of the region along with the distance between the user's position and the task location, a location-based reminder for a task in the region can be generated at a more useful and sensible time for the user.

Figure 1:
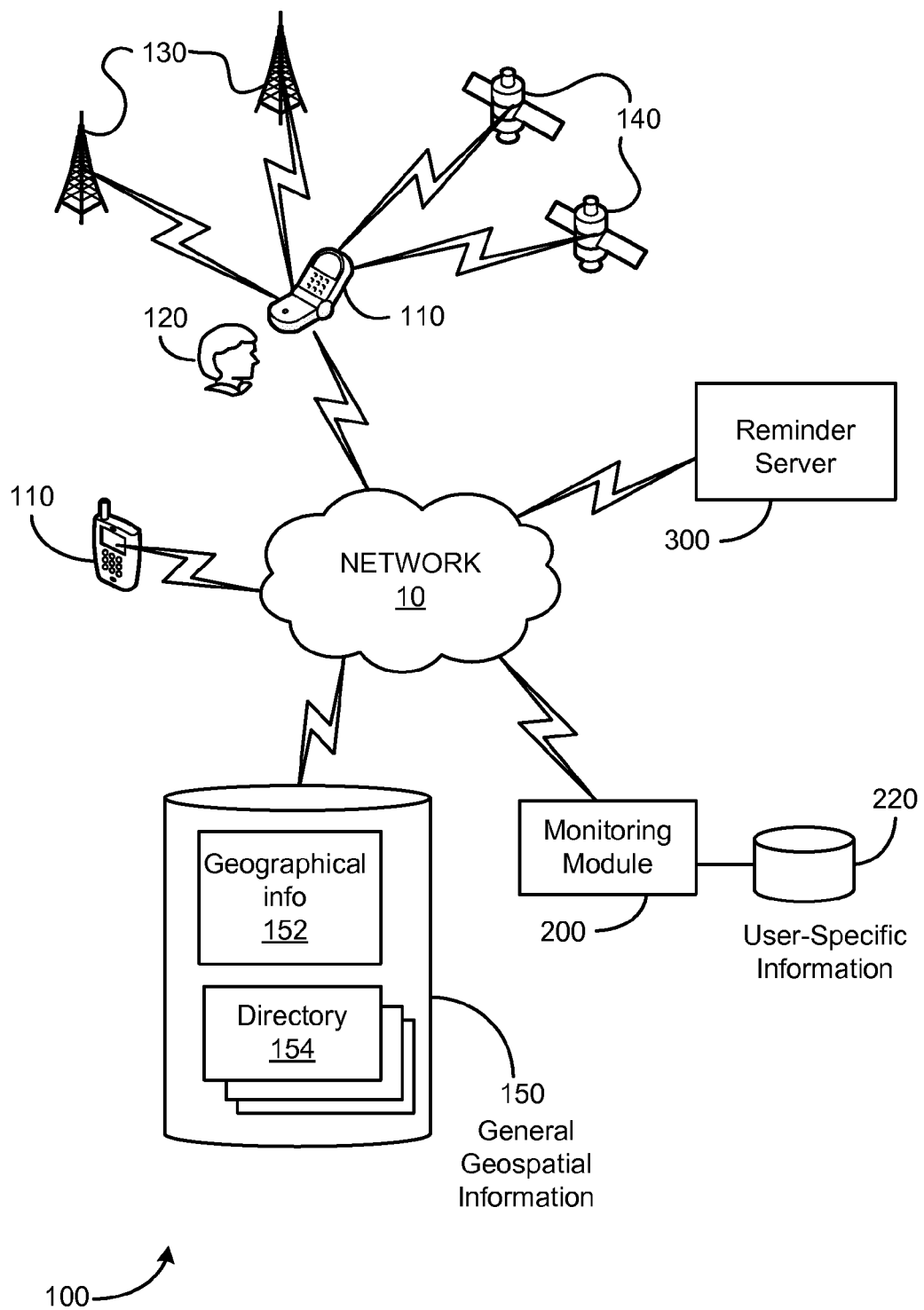
FIG. 1 is a block diagram illustrating an exemplary task reminder system according to an exemplary embodiment.

FIG. 1 is a block diagram illustrating an exemplary arrangement for a task reminder system 100 according to an exemplary embodiment. One or more network-enabled mobile communication devices 110, such as a digital camera/phone, PDA, laptop or the like, are in communication with a reminder server 300 over a network 10. A data store 150 includes general geospatial information relating to a plurality of locations and is accessed by the device 110 or the reminder server 300 over the network 10. The general geospatial information 150 is typically public information that can include geographical information 152 that maps geospatial coordinates to street names and building names. The geospatial information 150 can also include one or more directories 154 that provide other information associated with street addresses. Well known mapping services (not shown) can use the geospatial information 150 to generate traveling routes between two locations, and to determine a distance between two locations.

According to an exemplary embodiment, the system 100 includes means for monitoring a location of a user via a mobile communication device associated with the user at predetermined time intervals, such as a monitoring module 200 that is in communication with the devices 110 and with the reminder server 300 over the network 10. In an exemplary embodiment, the monitoring module 200 monitors the location of the user in order to track the historical travel information of the user.

The system further includes means for receiving user specified task information, which includes a task and a task location, and means for storing user-specific information that includes the historical travel information of the user and the user specified task information. For example, in an exemplary embodiment, the monitoring module 200 is configured to store and manage the user-specific information in a data store 220.

Figure 2:
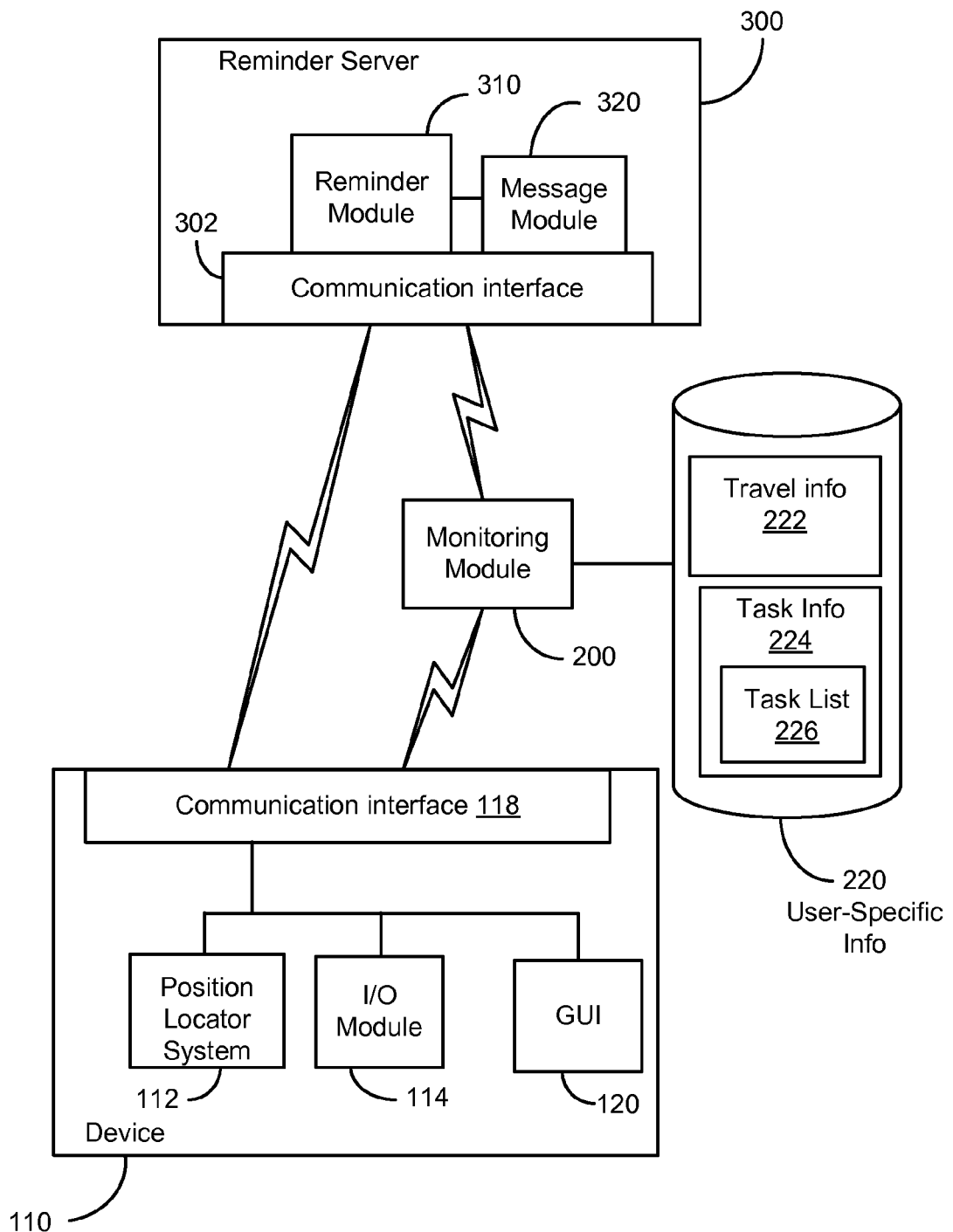
FIGS. 2-4 are more detailed block diagrams illustrating the task reminder system according to several exemplary embodiments.

FIG. 2 is a more detailed block diagram of the reminder system 100 according to an exemplary embodiment. Each device 110 includes circuitry that can track a position of the device 110. For example, the device 110 can include a position locator system 112 that tracks the position of the device 110. The position locator system 112 can be the well known global positioning system (GPS) that utilizes satellites 140 (FIG. 1) to determine the device's longitudinal and latitudinal position. Alternatively, the position locator system 112 can be configured to utilize one or more base stations 130 within communication range to determine the device's location. Each mobile communication device 110 also includes circuitry for communicating with the reminder server 300 and monitoring module 200. For example, the device 110 can include a communication interface 118 coupled to a user interface 120 and input/output (I/O) module 114 that allows the user 120 to use the device 110 to communicate with the server 300 over a wireless network 10 using one or more communication protocols.

The monitoring module 200 can be a personal computer or other device capable of collecting, storing and managing data. The monitoring module 200 can include a communication interface (not shown) to receive and transmit data over the network 10. In one embodiment, the monitoring module 200 monitors the location of the device 110 at predetermined time intervals in order to track the user's historical travel information 222. The historical travel information 222 can include the number of times the user 120 is present at or near a location, the amount of time the user is present at or near the location, the number of times the user has changed his or her position between at least two locations, and/or the number of times the user has entered or exited a region. The historical travel information 222 is stored in the data store 220 along with the task information 224.

The reminder server 300 can be a personal computer or other device capable of processing data. The reminder server 300 includes a communication interface 302 to transmit and receive data over the network 10. In one embodiment, the reminder server 300 is configured to retrieve user-specific information from the data store 220 over the network 10 via the monitoring module 200.

The system 100 further includes means for generating a reminder of a task based on the user's historical travel information and a distance between the task location and a current position of the user. For example, according to an exemplary embodiment, the reminder server 300 includes a reminder module 310 and a message module 320, which are both communicatively coupled to the communication interface 302.

In an exemplary embodiment, the reminder module 310 is configured to determine whether it would be useful to generate a task reminder for the user based on where the user is currently positioned and the distance between the user and the task location. In one embodiment, the reminder module 310 is configured to calculate a novelty rating of a region that includes the task location and a current position of the user. The novelty rating of the region is based on the user's historical travel information and is related to the historical presence of the user in the region.

In one embodiment, the reminder module 310 determines whether a reminder should be generated based on a combination of the novelty rating of the region and the distance between the user and the task location. When the reminder module 310 determines that a message should be generated, it calls the message module 320, which is configured to generate and send a task reminder to the user.

Figure 3:
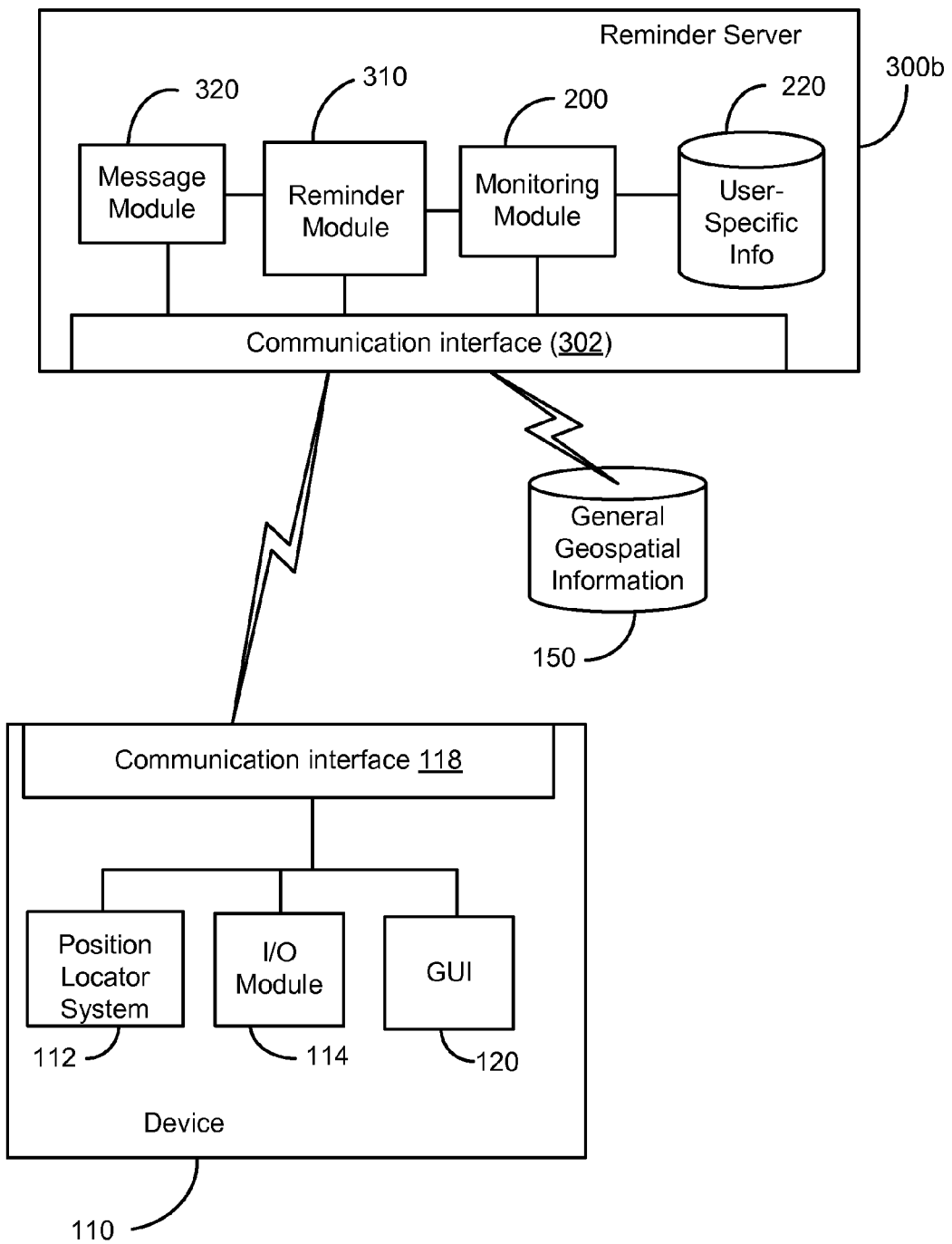

The system 100 illustrated in FIG. 1 and FIG. 2 is but one exemplary arrangement. In this arrangement, a "thin" mobile communication device 110 can be accommodated because the historical travel information 222 and task information 224 can be stored remotely and the functionality of the monitoring module 200 and the reminder 310 and message 320 modules can be included in separate servers. Other arrangements can be designed by those skilled in the art. For example, in one embodiment shown in FIG. 3, the functionality of the monitoring module 200 and the data store 220 can be included in the reminder server 300b so that the reminder server 300b securely manages the user-specific information 220.

Figure 4:
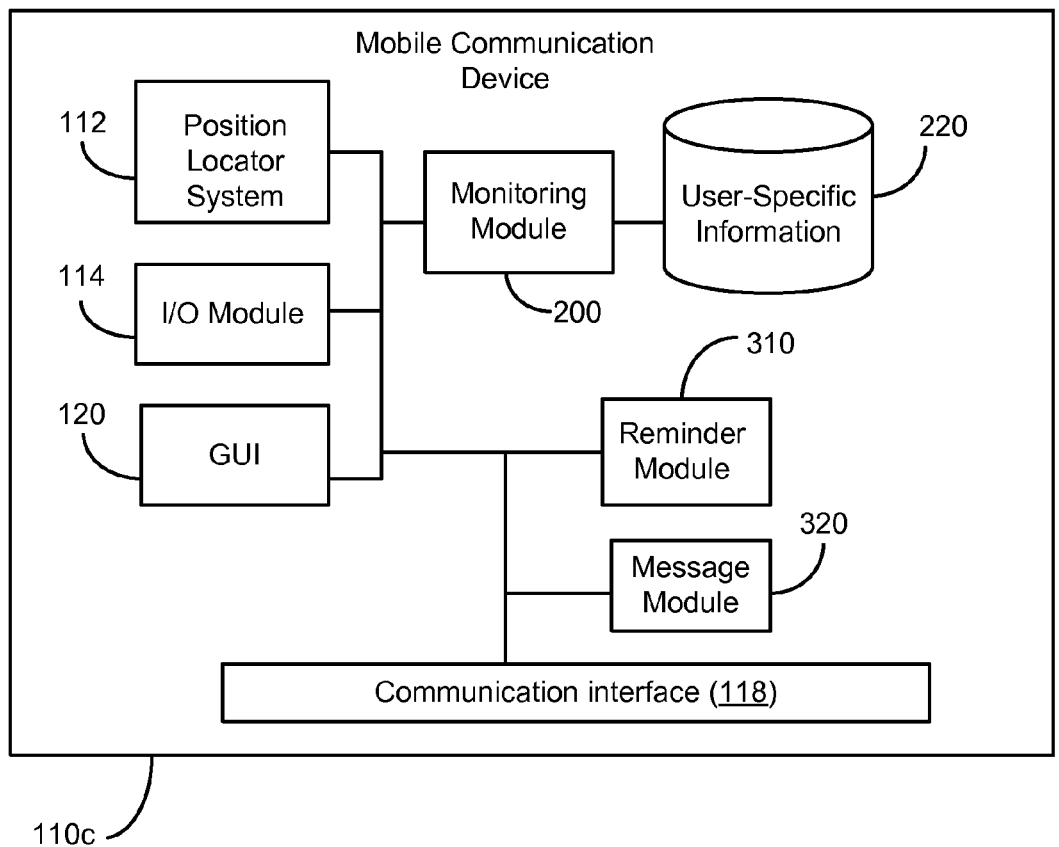

In another embodiment, shown in FIG. 4, the mobile communication device 110c can perform the functions of the reminder 310 and message 320 modules and the monitoring module 200, and store the user-specific information 220 internally in the device memory (not shown). In this arrangement, the reminder server 300 is not required. Variations of these embodiments may be utilized and structural and functional modifications may be made without departing from the scope of the present disclosure. For example, the functionality of the monitoring module 200 can be integrated with that of the mobile communication device 110 and can be configured to transmit the historical travel information 222 to the reminder module 310, which stores and manages the information in the data store 220. In this example, the reminder module 310 can also be configured to receive and store the task information 224 directly from the mobile communication device 110, and can manage the information in the data store 220.

Figure 5:
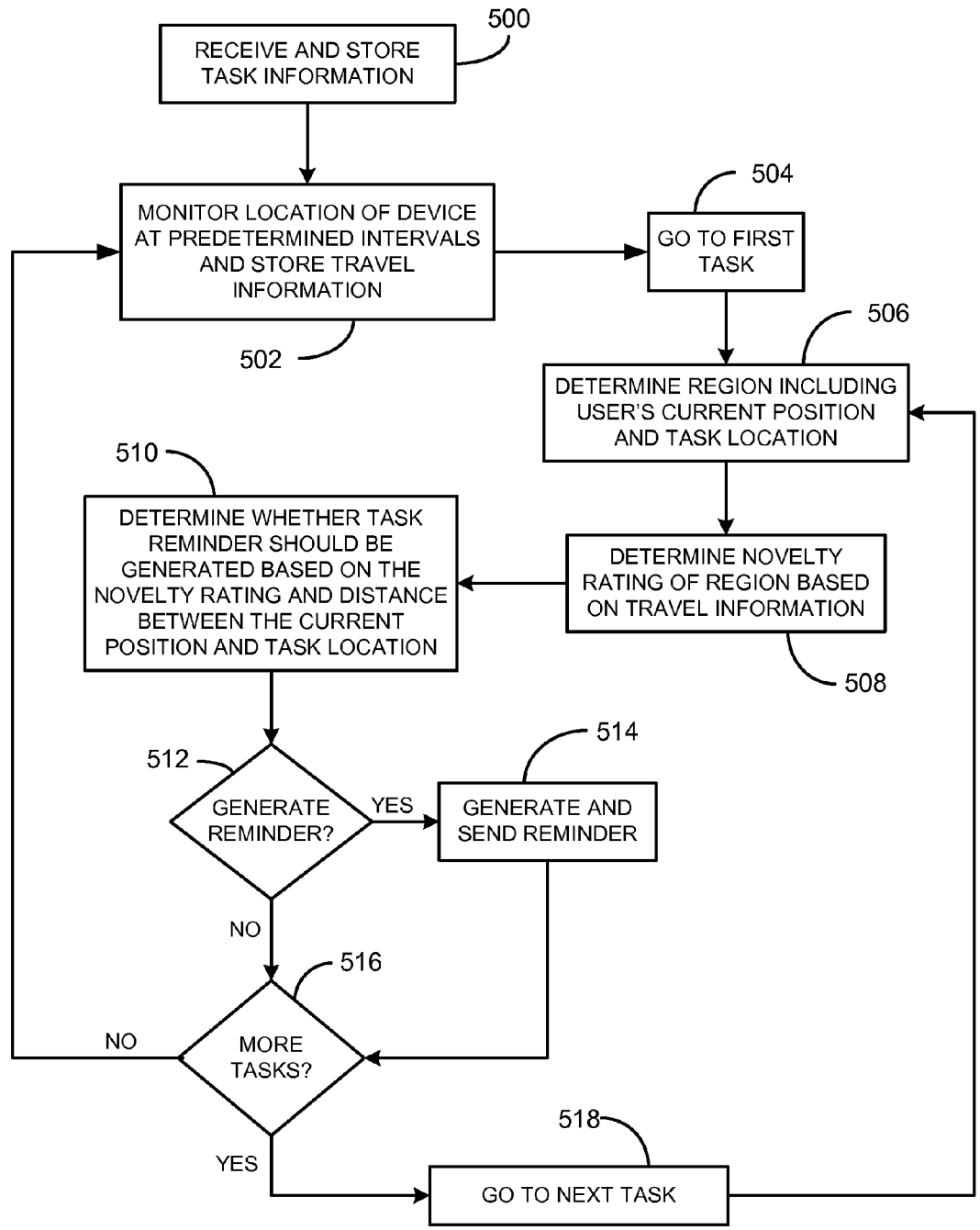
FIG. 5 is a flow diagram illustrating an exemplary process for providing a task reminder according to an exemplary embodiment.

FIG. 5 is a flow diagram illustrating an exemplary process for providing a task reminder according to one embodiment.

Referring to FIGS. 1-4, the exemplary process begins when user-specified task information 224 is received and stored in the data store 220 (step 500). In one embodiment, the task information 224 includes a description that describes the task and a task location that indicates where the task can be performed. In addition, the task information 224 can indicate a priority level, a time frame in which the task should be completed, with whom the task should be performed, and any other information related to the task, e.g., prescription number, phone number to call, etc. The task location can be represented by any one of the geospatial coordinates of the task location, a street address, and a location name.

In one embodiment, the user 120 specifies the task information 224 using a network enabled device, such as the mobile communication device 110, and sends the task information 224 to the reminder module 310 in the reminder server 300 or to the monitoring module 200 over the network 10 via the communication interface 118. The task information 224 is then organized in a task list 226. In one embodiment, the task list 226 includes at least one task and a reference to the associated task information. The tasks can be sorted in the order in which they were received, by priority, by time frame, or by any other suitable factor.

Referring again to FIG. 5, in addition to receiving and storing the task information 224, the location of the mobile communication device 110 is monitored at predetermined time intervals and the historical travel information is stored in the data store 220 (step 502). In one embodiment, an entire geographical area of interest is represented by a plurality of contiguous cells, where different cells do not overlap. The user's position can be identified by geospatial coordinates generated by the position locator system 112 in the device 110 or provided by the user 120 via the I/O module 114. The geospatial coordinates of the user/device 110 can be used to identify the cell in which the user's position is located so that the historical travel information of the user can be tracked.

In one embodiment, the monitoring module 200 monitors the device's location and collects the historical travel information of the user 222 by querying the position locator system 112 in the device 110 at a fixed time interval. For example, the monitoring module 200 can collect the travel information 222 every two minutes. In another embodiment, the monitoring module 200 can collect the information 222 at a time interval proportional to a velocity or expected velocity of the mobile communication device 110. For example, if the mobile communication device 110 is installed in a car, the expected velocity can be based on the average velocity of the car.

According to an exemplary embodiment, the monitoring module 200 keeps track of the number of times the user 120 is present in a cell, the amount of time the user is present in a cell, the number of changes in the user's position between at least two cells, and/or the number of times the user has entered or exited a cell boundary. This information, referred to above as the historical travel information of the user 222 is stored in the data store 220.

According to an exemplary embodiment, after the historical travel information 222 is stored, the reminder module 310 considers a first task on the task list 226 (step 504). A novelty calculation module 312 in the reminder module 310, shown in FIG. 4, determines a region that includes the user's current position and the task location (step 506). In one embodiment, the region is symmetrical and centered on the cell including the task location. Once the region is determined, the reminder module 310 determines the novelty rating of the region based on the travel information 222 of the user 120 (step 508).

Figure 7:
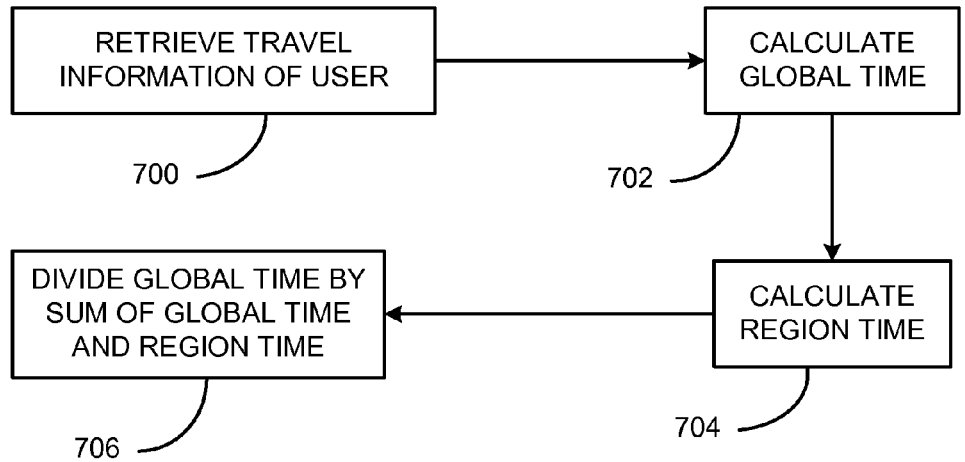
FIG. 7 is a flow diagram illustrating an exemplary process for determining a novelty rating for a region according to an exemplary embodiment.

FIG. 7 is a flowchart illustrating an exemplary process for determining the novelty rating for the region according to one embodiment. The process begins when the novelty calculation module 312 retrieves the historical travel information 222 of the user 120 from the data store 220 (block 700). In one embodiment, the information 222 can be retrieved via the monitoring module 200. In another embodiment, a data manager 313 in the reminder module 310, shown in FIG. 4, can retrieve the information 222 directly from the data store 220.

Once the information 222 is retrieved, the novelty calculation module 312 calculates a global time (block 702) which is a quantification of the user's historical presence throughout the entire geographical area of interest. In one embodiment, the global time is calculated by enumerating at least one of the total amount of time the user has spent in any cell, the total number of changes in the user's position between at least two cells, the total number of times the user has entered or exited any region, and the total number of times the user has been present in any cell.

Once the global time has been calculated, the novelty calculation module 312 calculates a region time (block 704), which is a quantification of the user's historical presence in the region. Similar to the global time, the region time can be calculated by enumerating at least one of the total amount of time the user has spent in any cell in the region, the total number of changes in the user's position between at least two cells in the region, the total number of times the user has entered or exited the region, and the total number of times the user has been present in any cell in the region.

The novelty of the region is then determined by dividing the global time by the sum of the global time and the region time (block 706). Accordingly, as the region time increases, the novelty rating of the region decreases, signifying that the region becomes less novel to the user as the user becomes more familiar with the region. Conversely, when the region time is relatively small, the novelty rating of the region increases, signifying that the region's novelty to the user is higher when the user is less familiar with the region. Note that once the novelty calculation module 312 has calculated the global time, the same global time can be cached and used to calculate the novelty rating for other regions associated with other tasks on the task list 226, thereby improving efficiency and performance.

Figure 6:
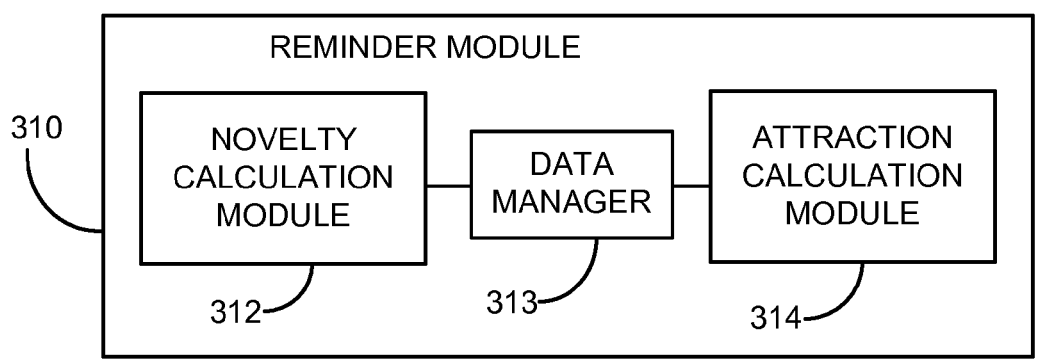
FIG. 6 is a block diagram illustrating an exemplary reminder module according to an exemplary embodiment.
Figure 8:
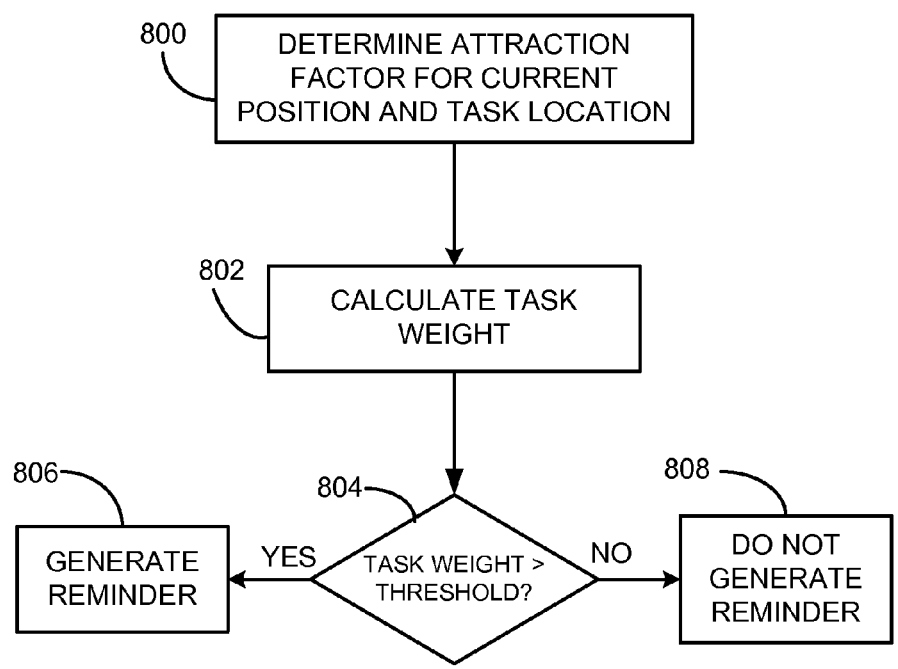
FIG. 8 is a flow diagram illustrating an exemplary process for determining whether a reminder should be generated according to an exemplary embodiment.

Referring again to FIG. 5, once the novelty rating of the location is determined (block 508), the reminder module 310 determines whether a task reminder should be generated based on the novelty rating and the distance between the current position and the task location (block 510). FIG. 8 is a flowchart illustrating an exemplary process for determining whether a task reminder should be generated according to one embodiment. The process begins when an attraction calculation module 314 in the reminder module 310, shown in FIG. 6, determines an attraction factor based on the current position of the user 120 and the task location (block 800). In an exemplary embodiment, the attraction factor is inversely proportional to the distance, D, between the task location and the current position of the user 120. That is, the attraction factor, A, increases as D decreases. In one embodiment, the attraction factor, A can be represented by:

$$A=(1+D)^{-1}$$

In one embodiment, the distance between the current position of the user 120 and the task location can be the length of a street route or a geospatial distance, i.e., "as the crow flies," between the user 120 and the task location. Alternatively, the distance can be represented by the expected travel time between the current position of the user 120 and the task location.

Once the attraction factor is determined, the reminder module 310 calculates a task weight comprising a product of the attraction factor with the novelty rating (block 802), and compares the task weight to a predetermined threshold value (block 804). If the task weight is greater than the threshold value, then a task reminder should be generated (block 806). Conversely, if the task weight is less than the threshold value, the task reminder should not be generated (block 808). In this manner, whether the task reminder is generated depends on both the current distance between the user 120 and the task location, and the novelty rating of the region to the user 120. For instance, when the novelty rating for a region is low, the distance between the user and the task location at which a task reminder is generated will be smaller than the distance for a region having a higher novelty rating.

Referring again to FIG. 5, when the reminder module 310 determines that a task reminder should be generated (block 512), the reminder module 310 can call the message module 320, which is configured to generate and send the reminder to the user 120 via the mobile communication device (block 514). In one embodiment, the message module 320 can first determine whether the user 120 is available to receive the reminder. In one embodiment, the user 120 is available when she is actively using the mobile communication device 110 or has recently used the device 110 within a specified time period, e.g., 10 seconds. In one embodiment, the message module 320 can call the monitoring module 200 to make this determination.

If the user 120 is using or has recently used the device 110, e.g. taking pictures or sending messages to others, the message module 320 can send a message that includes the task reminder to the user 120 during use or immediately after the user 120 has stopped actively using the device 110. Otherwise, the message module 320 can wait until the user 120 is available. In one embodiment, when the task reminder for a task has been sent, the message module 320 is configured to prevent a subsequent task reminder for the same task to be sent unless a predetermined time period has expired.

After the task reminder has been sent or when the reminder module 310 determines that the task reminder should not be generated because, for example, the task weight does not exceed the threshold value, the reminder module 310 determines whether more tasks remain on the task list 226 to be processed (block 516). If no other tasks remain, the process returns to monitoring the device's location (block 502). Otherwise, the next task is considered (block 518) and the process repeats at block 506 where the task region is determined.

In one embodiment, when the message including the task reminder is sent, the device 110 receives the message via the communication interface 118 and the message is displayed to the user 120 on the device's user interface 120. The user 120 can respond to the task reminder explicitly and implicitly. In one embodiment, the user 120 can respond positively by explicitly "accepting" the reminder using the mobile communication device 110. Alternatively, or in addition to, the user 120 can implicitly respond positively by traveling to the task location within a certain time period after receiving the message and optionally remaining at or near the task location for a period of time. Similarly, the user 120 can respond negatively by explicitly "rejecting" the reminder or by moving away from the task location.

According to an exemplary embodiment, the reminder module 310 can receive or monitor the user's response to the task reminder and adjust the threshold value based on the user's response. For example, in one embodiment, the threshold value can be lowered when the user 120 responds positively to the reminder and can be increased when the user 120 responds negatively to the reminder. In another embodiment, the reminder module 310 can adjust the threshold value based on the importance of the task, as indicated explicitly or by name. For example, the threshold value can be lowered as the importance of the task increases. In yet another embodiment, the threshold value can be based on the time frame in which the task is to be completed where the threshold value is lowered as the time frame becomes smaller.

The executable instructions of a computer program as illustrated in FIG. 5, FIG. 7 and FIG. 8 can be embodied in any computer readable medium for use by or in connection with an instruction execution system, apparatus, or device, such as a computer based system, processor containing system, or other system that can fetch the instructions from the instruction execution system, apparatus, or device and execute the instructions.

As used here, a "computer readable medium" can be any means that can contain, store, communicate, propagate, or transport the program for use by or in connection with the instruction execution system, apparatus, or device. The computer readable medium can be, for example, but is not limited to, an electronic, magnetic, optical, electromagnetic, infrared, or semiconductor system, apparatus, device, or propagation medium.

More specific examples (a non-exhaustive list) of the computer readable medium can include the following: a wired network connection and associated transmission medium, such as an ETHERNET transmission system, a wireless network connection and associated transmission medium, such as an IEEE 802.11(a), (b), or (g) or a BLUETOOTH transmission system, a wide-area network (WAN), a local-area network (LAN), the Internet, an intranet, a portable computer diskette, a random access memory (RAM), a read only memory (ROM), an erasable programmable read only memory (EPROM or Flash memory), an optical fiber, a portable compact disc (CD), a portable digital video disc (DVD), and the like.

It will be appreciated by those of ordinary skill in the art that the concepts and techniques described here can be embodied in various specific forms without departing from the essential characteristics thereof. The presently disclosed embodiments are considered in all respects to be illustrative and not restrictive. The scope of the invention is indicated by the appended claims, rather than the foregoing description, and all changes that come within the meaning and range of equivalence thereof are intended to be embraced.

What is claimed is:

1. A method of providing a task reminder, the method comprising:
 receiving a location of a user of a mobile communication device;
 identifying task information including a task location;
 receiving historical presence information identifying least one of a number of times the user is present at the location and an amount of time the user is present at the location; and
 providing a reminder of the task for presentation based on the historical presence information and a distance between the task location and the location of the user.

2. The method of claim 1 wherein the distance between the task location and the location of the user is at least one of a length of a street route between the location of the user and the task location, an expected travel time between the location of the user and the task location, and a geospatial distance between the location of the user and the task location.

3. The method of claim 1 further comprising:
 determining a novelty rating of a region that includes the task location and the location of the user based on the historical presence information; and
 determining an attraction factor that increases as the distance between the task location and the location of the user decreases.

4. The method of claim 3 wherein the region comprises a plurality of contiguous cells and wherein determining the novelty rating of the region further includes:
 calculating a region time comprising at least one of an amount of time the user has spent in any cell in the region, a number of changes in the user's position between at least two cells within the region, a number of times the user has entered or exited the region, a number of times the user has been present in any cell in the region, and a random sampling of the user's position;
 calculating a global time comprising at least one of an amount of time the user has spent in any cell, a number of changes in the user's position between at least two cells, a number of times the user has entered or exited any region, and a number of times the user has been present in any cell; and
 calculating the novelty rating of the region by dividing the global time by the sum of the global time and the region time.

5. The method of claim 3 further including:
 calculating a task weight comprising a product of the novelty rating of the region and the attraction factor;
 generating the reminder of the task when the task weight exceeds a threshold value; and
 transmitting the reminder to the user via the mobile communication device.

6. The method of claim 5 further including adjusting the threshold value based on the user's response to the reminder.

7. The method of claim 1 further comprising:
 sending the reminder of the task to the user via the mobile communication device; and
 preventing a subsequent reminder of the task for a predetermined time thereafter.

8. An apparatus for providing a task reminder, the apparatus comprising:
 a position component configured to receive a location of a user of a mobile communication device;
 a reminder module configured to identify task information including a task location;
 a message module configured to receive historical presence information identifying at least one of a number of times the user of a mobile communication device is present at a location and an amount of time the user of the mobile communication device is present at a location;
 a user interface component configured to provide a reminder of the task for presentation based on the historical presence information and a distance between the task location and the location of the user.

9. The apparatus of claim 8 wherein the distance between the task location and the location of the user is at least one of a length of a street route between the location of the user and the task location, an expected travel time between the location of the user and the task location, and a geospatial distance between the location of the user and the task location.

10. The apparatus of claim 9 wherein the reminder module is further configured to calculate a novelty rating of a region that includes the task location and a location of the user based on the user's historical travel information, wherein the novelty rating is related to the historical presence of the user in the region, wherein the reminder module is configured to determine an attraction factor that increases as the distance between the task location and the location of the user decreases.

11. The apparatus of claim 10 wherein the region comprises a plurality of contiguous cells and the reminder module is configured to calculate the novelty rating of the region based on a region time comprising at least one of an amount of time the user has spent in any cell in the region, a number of changes in the user's position between at least two cells within the region, a number of times the user has entered or exited the region, a number of times the user has been present in any cell in the region, and a random sampling of the user's position.

12. The apparatus of claim 10 wherein the reminder module is further configured to determine whether the novelty rating of the region exceeds a threshold value and wherein the message module is configured to generate the reminder of the task when the product exceeds the threshold value.

13. The apparatus of claim 12 wherein the reminder module is further configured to adjust the threshold value based on the user's response to the reminder.

14. The apparatus of claim 8 wherein the message module is further configured to transmit the reminder of the task to the user via the mobile communication device and to prevent a subsequent reminder of the task for a predetermined time thereafter.

15. The apparatus of claim 8, wherein the apparatus is a mobile communication device comprising:
 a communication interface coupled to a network; and
 wherein the position component comprises a position locator system configured to identify the location of the mobile communication device.

16. The apparatus of claim 8, wherein the apparatus is a server comprising:
 a communication interface for communicating with the mobile communication device associated with the user over a network and configured to receive user-specified task information and the location of the mobile communication device.

17. A computer readable medium containing programming instructions for providing a task reminder, the program instructions for performing a method comprising:
 receiving a location of a user of a mobile communication device;
 identifying task information including a task location;
 receiving historical presence information identifying least one of a number of times the user is present at the location and an amount of time the user is present at the location; and
 providing a reminder of the task for presentation based on the historical presence information and a distance between the task location and the location of the user.

18. An apparatus for providing a task reminder, the apparatus comprising:
 means for receiving a location of a user of a mobile communication device;
 means for identifying task information including a task location;
 means for receiving historical presence information identifying least one of a number of times the user is present at the location and an amount of time the user is present at the location; and
 means for providing a reminder of the task for presentation based on the historical presence information and a distance between the task location and the location of the user.

* * * * *

UNITED STATES PATENT AND TRADEMARK OFFICE
CERTIFICATE OF CORRECTION

PATENT NO. : 8,471,696 B2
APPLICATION NO. : 13/458210
DATED : June 25, 2013
INVENTOR(S) : Munindar Singh Page 1 of 1

It is certified that error appears in the above-identified patent and that said Letters Patent is hereby corrected as shown below:

In the Claims:

Column 9, line 57, after "identifying" insert --at--

Column 12, line 13, after "identifying" insert --at--

Column 12, line 27, after "identifying" insert --at--

Signed and Sealed this
Tenth Day of September, 2013

Teresa Stanek Rea
*Acting Director of the United States Patent and Trademark Office*